Figure 6:
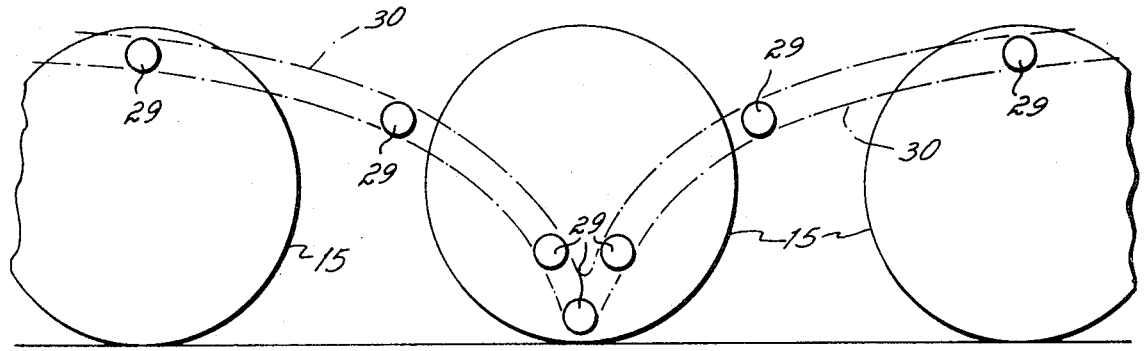

United States Patent
Burroughs et al.

[11] 3,731,388
[45] May 8, 1973

[54] MEASURING METHOD AND APPARATUS

[75] Inventors: Robert K. Burroughs, Batavia; Timothy A. Wakefield, Cincinnati, both of Ohio

[73] Assignee: R. K. LeBlond Machine Tool Company, Cincinnati, Ohio

[22] Filed: Nov. 3, 1970

[21] Appl. No.: 86,488

[52] U.S. Cl. ............................................. 33/125 M
[51] Int. Cl. ........................... G01b 3/12, B23a 15/00
[58] Field of Search ................................... 33/125 M

[56] References Cited

UNITED STATES PATENTS

| | | | |
|---|---|---|---|
| 3,307,265 | 3/1967 | Jenks et al. | 33/125 M X |
| 3,526,890 | 9/1970 | Malina et al. | 33/125 M X |
| 3,172,208 | 3/1965 | Lowy | 33/125 M X |

FOREIGN PATENTS OR APPLICATIONS

| | | | |
|---|---|---|---|
| 113,128 | 2/1945 | Sweden | 33/125 M |
| 509,406 | 1/1955 | Italy | 33/125 M |

*Primary Examiner*—Robert B. Hull
*Attorney*—Wood, Herron & Evans

[57] ABSTRACT

A method and apparatus for measuring movement of one element relative to another as, for example, a machine tool slide relative to a bed. The measurement is effected by rolling a disc over a flat reference surface. The disc in turn controls an electrical signal generator such as a resolver or an encoder which generates an electric signal indicative of the displacement of the disc relative to the reference surface. The effective rolling diameter of the disc is accurately controlled by preloading the disc into frictional engagement with the reference surface. A pin secured in an eccentric position on the disc is periodically passed over or through a synchronizing or rezeroing element so as to periodically and automatically synchronize or reset the disc relative to the reference surface and thereby eliminate cumulative error which might otherwise result from slippage or diametral errors between the two friction bearing surfaces.

24 Claims, 9 Drawing Figures

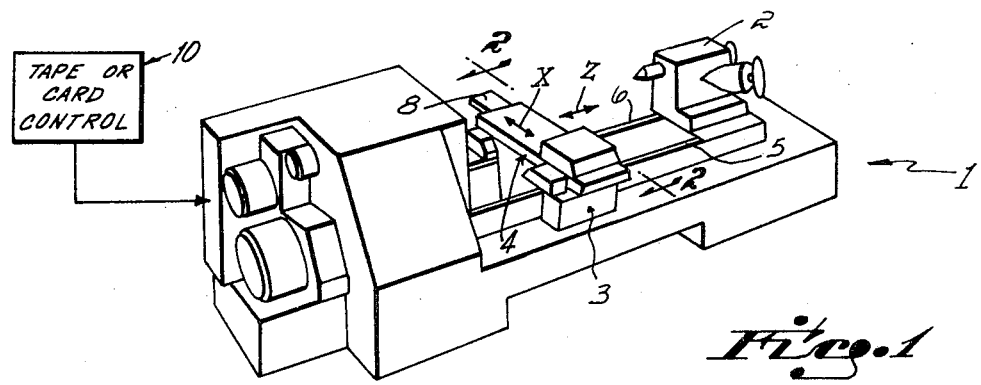
Fig. 1
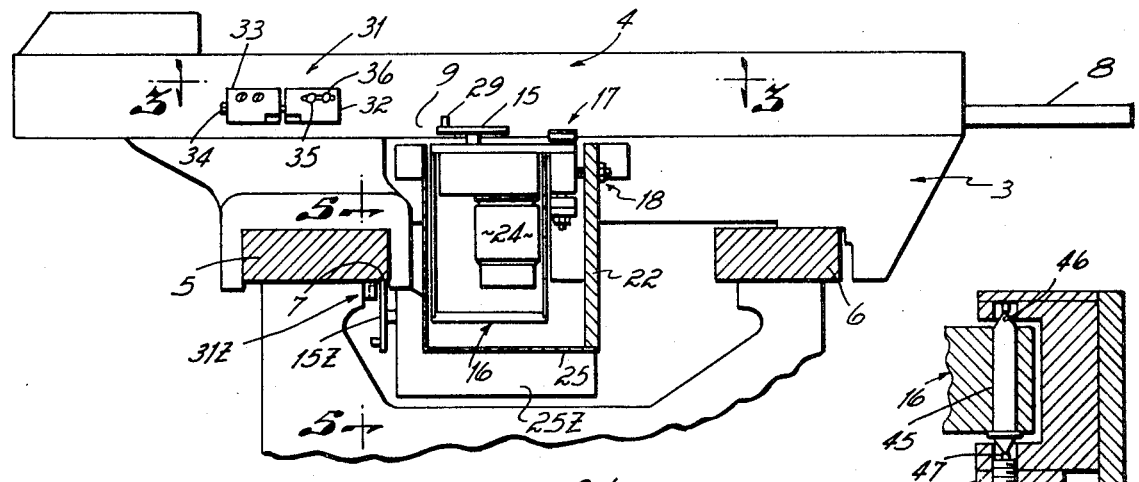
Fig. 2
Fig. 4
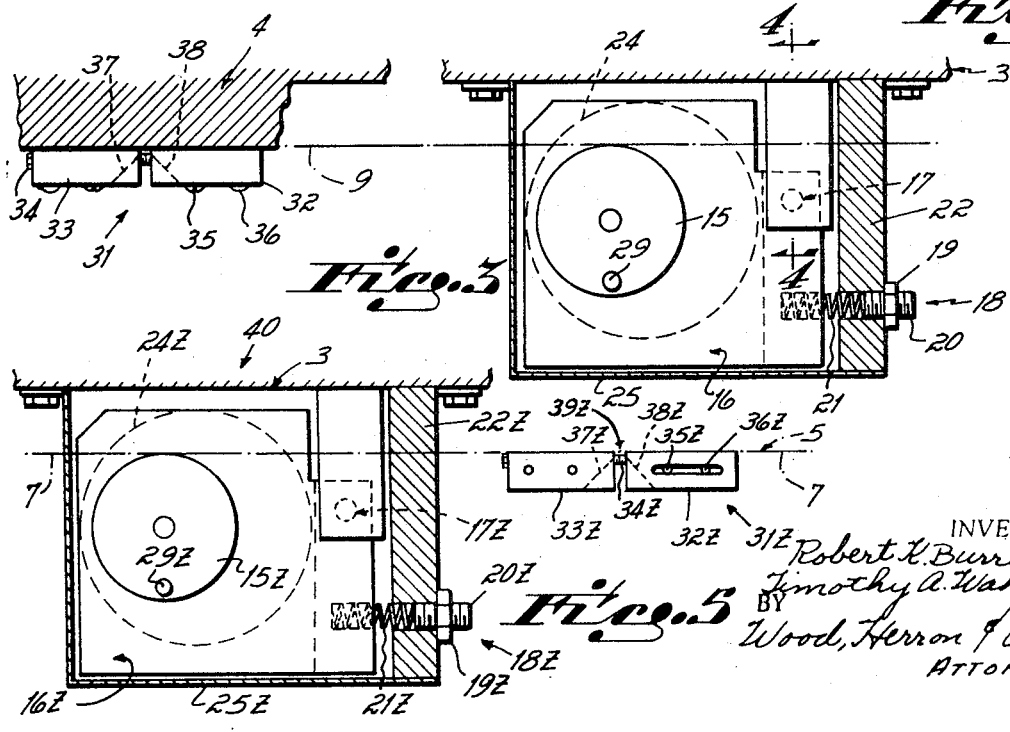
Fig. 3
Fig. 5
INVENTORS
Robert K. Burroughs
Timothy A. Wakefield
BY
Wood, Herron & Evans
ATTORNEYS INVENTORS
Robert K. Burroughs
Timothy A. Wakefield
BY
Wood, Herron & Evans
ATTORNEYS

MEASURING METHOD AND APPARATUS

This invention relates to measuring devices and particularly to devices for accurately measuring displacement of one moveable element relative to another. Specifically, it is concerned with the measurement and generation of a feed-back signal indicative of the displacement of a moveable element of an electrically programmed and controlled machine tool.

Electrically programmed machine tools, the control of which is generally effected by a coded tape or card, are now in common use. Generally, these machine tools operate on the principle of using a card or tape to generate an electrical command signal which is fed as an input into an electrical comparator. Another signal is supplied to the comparator from the machine indicative of the actual position of the commanded element. The comparator then generates a difference or "error" signal which effects movement of the slide or commanded element. The movement of the slide or commanded element in turn reduces the error signal until the error reaches zero and the movement is terminated.

This invention is applicable to all types of measuring systems but it is primarily concerned with the generation of a feedback signal to the comparator of an electrically programmed machine. One technique commonly employed for generation of a feedback signal is to secure a rack to the moveable element of the machine. As the rack moves with the moveable element it drives a pinion which in turn drives a resolver or encoder and generates position signals indicative of the actual position of the moveable element relative to the pinion. This type of system suffers from a lack of accuracy because it is no more accurate than the accuracy with which the teeth are machined on the rack or the pinion or the degree with which backlash is eliminated between the rack and pinion.

Another technique for generating the feedback signal is to utilize an optical device which generates optical digital data in response to movement of the slide or moveable element relative to some scale or optical scaling device. This type of arrangement is accurate but is very expensive.

Another approach and probably the one most commonly employed is to use a resolver or encoder secured to a lead screw which upon rotation effects movement of the slidable or moveable element. This is an indirect measuring technique in that it measures displacement of the screw which effects movement of the slide rather than measuring slide movement directly. This type of system suffers primarily from its requirement for an accurately machined and expensive lead screw. To minimize the accuracy required for the screw, a compensator cam is cut so as to generate a second or compensating error signal to balance any errors which occur throughout the length of the lead screw. This compensating cam technique for correcting or compensating for inaccuracies in the lead screw is expensive, although not as expensive as a very accurate lead screw, and can only correct or compensate for some types of lead screw errors or inaccuracies.

It has therefore, been a primary objective of this invention to provide a displacement measuring method and apparatus which is both accurate and inexpensive to manufacture and install.

This invention is predicated upon the concept of using a friction drive disc or roller to measure displacement of the moveable element as, for example, the displacement of a machine slide relative to another slide or bed of a machine tool. The frictionally driven roller is in turn operative to drive an electrical signal generator such as a resolver or encoder which generates an error or feedback signal to the comparator of a control system.

One aspect of this invention is predicated upon the concept of utilizing an adjustable preload force to accurately control the effective rolling diameter of the friction drive disc over a flat reference surface. Metal discs or rollers may be easily and inexpensively manufactured with an accuracy of plus or minus 50 millionths of an inch (0.000050 inch) using commercial machining and grinding techniques. This inaccuracy though is multiplied during each revolution of the disc. It has been determined that the effective rolling diameter of the disc may be varied and accurately controlled by varying the force with which the disc is forced into engagement with the reference surface over which it is frictionally rotated. Specifically, it has been determined that a preload force of between 100 and 300 pounds will not only maintain accurate frictional engagement of a hardened steel disc and a hardened steel reference surface, but may be adjusted within this general range to adjust the effective rolling diameter of the disc relative to the reference surface. This technique of adjusting the effective diameter of the disc enables less expensive manufacturing techniques to be employed in the initial manufacture of the disc and of the feedback system.

Still another aspect of the invention is predicated upon the concept of periodically and automatically rezeroing or synchronizing the measuring disc with respect to the reference surface. This is inexpensively and accurately effected by the securement of an eccentric pin on the disc and a synchronizing surface or block on the reference surface. As the pin moves through a cycloidal pattern of movement relative to the reference surface it is passed through a synchronizing V-shaped slot in a block. This has the effect, if there are any inaccuracies in the effective diameter of the disc or if any slippage has occured between the disc and the reference surface, of eliminating or correcting these inaccuracies. Consequently, the use of a single stationary V-shaped block on the reference surface and an eccentric pin on the measuring disc automatically and periodically rezeroes or synchronizes the disc with respect to the reference surface every time the disc moves past the reference block. Thus the buildup of inaccuracies in the feedback signal or system is automatically and periodically eliminated.

The primary advantage of this measuring and feedback system is that it is much less expensive to manufacture than systems heretofore commonly employed which were capable of the same degree of measuring accuracy. It also has a much higher degree of repeatability than prior art systems of comparable cost because of the minimization of cumulative error.

Figure 7:
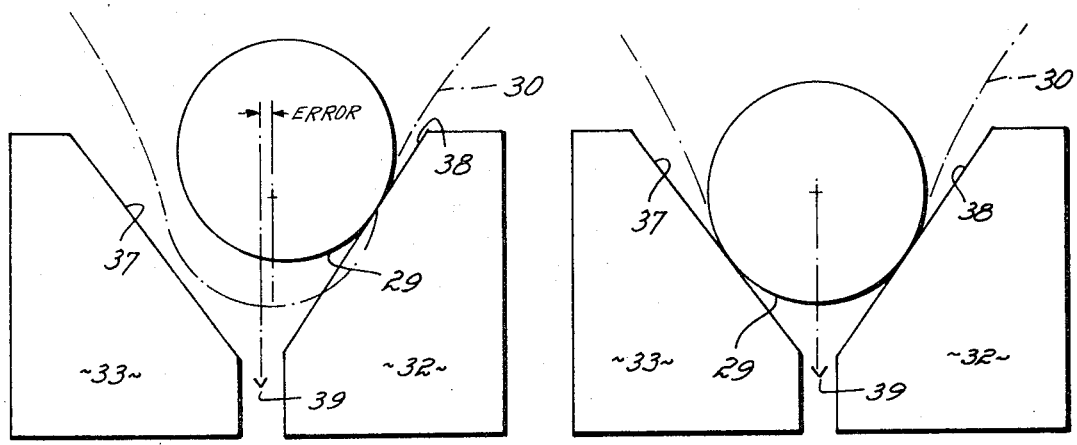
Figure 8:
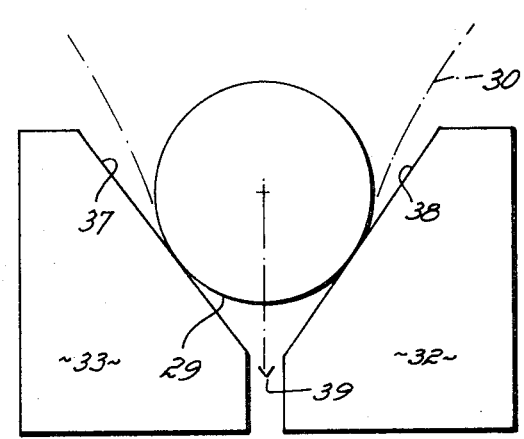
Figure 9:
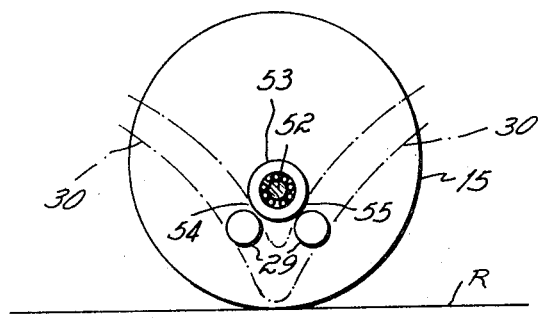

These and other objectives and advantages of this invention will be more readily apparent in the following description of the drawings in which:

FIG. 1 is a perspective view of a lathe incorporating applicant's invention,

FIG. 2 is a section taken along line 2—2 of FIG. 1 showing a side view of applicant's invention, FIG. 3 is a section taken along line 3—3 of FIG. 2 showing the measuring device in the X direction, FIG. 4 is a section taken along line 4—4 of FIG. 3 showing the pivot mount and bearing of the measuring disc, FIG. 5 is a view taken along line 5—5 of FIG. 2 showing the measuring device in the Z direction, FIG. 6 is a diagrammatic view showing the cycloidal path of the pin mounted on the measuring disc, FIG. 7 is a diagrammatic view showing the pin in a to-be-corrected position when the measuring disc is in an improper angular relationship to a measuring surface, FIG. 8 is a diagrammatic view showing the pin in proper corrected position with respect to the angled surfaces, and;

FIG. 9 is a view showing an alternate embodiment of the correcting unit.

Referring first to FIG. 1, there is shown a typical tape control machine of the type upon which the invention is intended to be used. The embodiment shown in FIG. 1 is that of a tape controlled lathe 1. However, the present invention may be adapted for use in any machine or machine tool where a very high degree of accuracy is required.

The lathe of FIG. 1 includes a head stock and chuck (not shown) for holding and rotating a work piece (also not shown) and a tail stock 2 for further supporting the work piece. The lathe further includes a longitudinally moveable carriage 3 which supports and carries a cross slide 4, moveable toward and away from the work piece. A turret or tool support is mounted upon the cross slide 4 so as to follow the longitudinal movements of the carriage 3 and the transverse movement of the cross slide 4, these directions being designated as the Z and X directions respectively.

Referring now to FIGS. 2 and 3, the carriage 3, as well as the headstock and tailstock, is supported by and moves on ways 5 and 6, the inward underside portion of the way 5 being designed as a measuring or reference surface 7 in the Z direction. The cross slide 4 moves upon and is supported by the cross slide way 8. The vertical outside portion of cross slide 4 is designated as measuring or reference surface 9. The carriage movement in the Z direction and the moveable cross slide movement in the X direction are powered by conventional means such as a motor-powered screw and an hydraulic cylinder respectively. These units are controlled by electrical control circuit and programming means conventional to the art and generally designated in FIG. 1 at 10. Signals derived from the measuring devices of the invention are fed back into the circuit indicating the exact positions of the functioning parts so that the circuit can correct any errors.

A measuring disc 15 is mounted on a pivotable unit designated generally at 16. The pivotable unit 16 is pivoted at 17 on a jewel bearing, later described, such as the one shown in FIG. 4. The pivotable unit 16 and disc 15 are biased against measuring surface 9, and are pre-tensioned by an adjustable screw and spring device, shown at 18 in FIG. 3.

The screw and spring device 18 includes a lock nut 19, a screw 20 and a spring 21. The screw 20 is threaded into a tapped hole in a block 22 and held in a selected position by advancing the lock nut 19 against the block 22. The spring 21 is sandwiched or captured between the end of screw 20 and pivotable unit 16 so as to bias the disc 15 against reference surface 9. Adjustment of screw 20 varies the compression of spring 21 and thus the force biasing disc 15 against surface 9. This force varies the rolling diameter of disc 15 and may be varied to cancel out manufacturing tolerances of the disc. It should be noted that each point along the measuring surface 9 in the X direction has an exact corresponding point on the work piece in the same direction so that any given angular position of disc 15, since it is in rolling contact with surface 9, indicates a corresponding point on the work piece.

Pivotable unit 16 carries an electrical signal generator such as a resolver or encoder 24 for translating the rotation of disc 15 into electrical feedback signals for use in the control circuit. A housing 25 encloses the resolver or encoder 24, the pivot bearing 17 and the tensioning structure 18.

Some conventional means for detecting velocity of movement at the cross slide is generally provided as is conventional to the art and therefore not shown. Such a velocity measuring device may include another rotatable disc cooperating with the appropriate reference surface, the rotation of the disc being translated into signals, indicative of the velocity, for use in the tape control 10.

A pin 29 is rigidly mounted on disc 15 by means which secures its position relative to the disc. As disc 15 rotates, the locus of pin 29 describes a cycloidal path 30, clearly shown in FIG. 6. An X direction correcting or rezeroing unit 31 is shown mounted on surface 9 in proximity to the linear path that is traversed by the disc 15. It comprises block 32 adjustably mounted on surface 9 and block 33, rigidly mounted on surface 9. The blocks 32 and 33 are adjustable with respect to each other in the X direction by virtue of the set-table capability of their position securing means comprising bolts 34, 35 and 36. Block 33 has an angular surface 37 and block 32 has an angular surface 38, both also shown diagrammatically in FIGS. 7 and 8. When the blocks touch, these angular surfaces form a "V" shaped indention. When the blocks are adjusted apart, imaginary extensions of the angular sides form a variable apex 39 as shown in FIGS. 7 and 8.

The measuring device for movement in the Z direction is similar to the measuring device for movement in the X direction and for clarity, similar parts will be similarly designated with the addition of the suffix Z.

This device is referred to generally at 40 in FIG. 5. It can be seen that the disc 15Z has a pin 29Z rigidly mounted thereon. Disc 15Z is mounted on a unit pivotable at 17Z with respect to the measuring surface 7 of way 5 and the unit is adjustably pressed by spring 21Z such that disc 15Z is biased into rolling engagement with the measuring surface 7. The adjustable screw and spring structure 18Z has for its support a rigid member 22Z. Since the movement of the carriage 3 in the Z direction is powered by a conventional motor and screw drive, the velocity signal necessary for the control circuit is obtained from a motor shaft in a conventional manner and the extra velocity pick-up disc and signal generator is not needed at this location although it could be used if desired.

It should be noted that measuring surface 7 is exactly parallel to the Z direction and that any given point on surface 7 corresponds to its exact related point on the work piece in the Z direction so that the angular relationship of disc 15Z, which is in rolling control with surface 7 at that point, corresponds also to the same point on the work piece. The Z correcting unit 31Z is constructed similarly to the X correcting unit 31 and has angular surfaces 37Z and 38Z located on adjustable blocks 33Z and 32Z such that imaginary extensions from these surfaces form an apex 39Z similar to the variable apex 39 shown diagrammatically in FIGS. 7 and 8. Blocks 33Z and 32Z are adjustable toward and away from each other in the Z direction such that the apex 39Z is thereby adjustable in the same respective directions. It should be noted that measuring unit 40 is mounted on carriage 3 and that the unit moves along in the Z direction with carriage 3, the disc 15Z rolling on surface 7. The measuring unit for the X direction also is mounted on carriage 3 and translates in the Z direction as the carriage moves, but disc 15 receives its angular motion by rolling on surface 9 as the cross slide 4 is translated in the X direction.

The pivot of either measuring device may consist of a jewel bearing such as the one shown in FIG. 4, although any appropriate bearing may be used. These bearings include a bearing shaft 45 with bearing surfaces 46 on either end which cooperate with appropriate bearing elements 47. The bearing unit is maintained in position by virtue of bolt 48 and nut 49 attached to a plate 50.

In operation, carriage 3 moves in the Z direction according to the programming signal from the control circuit. As the carriage 3 moves, disc 15Z rolls on surface 7 and thereby indicates the exact position of carriage 3 and, in turn, the cross slide along the Z direction. Adjustable blocks 32Z and 33Z are pre-adjusted so that a line through their apex 39Z, the center of pin 29Z, and the center of disc 15Z is perpendicular to surface 7 at precisely the point when the pin is in the correct position. As the carriage 3 and disc 15Z roll past the correcting unit 31Z, pin 29Z moves into the "V" shaped indention. If the disc 15Z has not slipped or otherwise rotated out of its correct position, pin 29Z bears on angular sides 37Z and 38Z simultaneously as shown diagrammatically with reference to the X direction corrector in FIG. 8 and disc 15Z moves on in its precisely correct angular relationship to surface 7. If disc 15Z has slipped or is out of its precise angular relationship to surface 7, pin 29Z strikes only one angular surface as seen in FIG. 7 and disc 15Z is caused to slightly raise and slip on surface 7 until pin 29Z slips and bears on both angular surfaces. Providing this corrective angular slippage can be regarded as orienting the disc's pin and therefore the disc about the disc's axis and thereby correcting the relationship of disc 15Z with respect to surface 7. The correcting action of the angular surfaces is functional if disc 15Z is behind of or in front of its correct position, since pin 29Z will bear on either angular side 37Z or 38Z and cause disc 15Z to lift and slip either forward or backward for correction.

In the same manner, cross slide 4 moves in the X direction in response to signals received from a control circuit. As the cross slide 4 moves in the X direction it imparts angular motion to disc 15. As correcting unit 31 moves toward disc 15, pin 29 is received in the "V" shaped indention. If the angular relationship of disc 15 to surface 9 is precisely correct at this point, pin 29 bears simultaneously on angular sides 38 and 37 as shown in FIG. 8, and disc 15 does not need to be and is not corrected. If the angular relationship of disc 15 to surface 9 is incorrect pin 29 bears on one of the angular sides as in FIG. 7 and disc 15 is slightly raised and slips to its correct position such that pin 29 bears on both angular surfaces. Thus, the disc 15 is oriented and corrected and subsequently rotates in correct angular relationship to surface 9. Signals derived from the precise angular positions of discs 15 and 15Z are fed back into the control circuit thus indicating the exact position of carriage 3 and more importantly the tool supporting cross slide with respect to the work piece in the X and Z directions respectively.

The effective rolling diameter of the discs 15 and 15Z may be varied and accurately controlled by varying the force which urges the discs into contact with their respective reference surfaces. A force of between 50 and 75 pounds, is generally sufficient to maintain accurate frictional engagement of the discs with the reference surfaces. The force may be adjusted and even increased beyond this range to vary the effective rolling diameter of the disc with its reference surface. This adjustment of the effective disc diameter allows less expensive manufacturing techniques to be used in the manufacture of the disc. Furthermore, the disc's diameter may be adjusted to provide an extremely high degree of accuracy since manufacturing tolerances may be overcome to provide in effect, a disc of perfect diameter. This precise accuracy tends to eliminate error due to manufacturing tolerances.

An alternate embodiment of the re-zeroing device is shown in FIG. 9 wherein a stationary pin 52 is used in place of the above mentioned correcting blocks. The pin 52 is held stationary with respect to the reference surface R by means not shown in the drawing. A bearing mounted roller 53 is placed over the pin 52 and is located such that it has two points of tangency 54 and 55, with the correct cycloidal path 30 of the pin 29. When disc 15 and pin 29 come into the area of the roller, the pin 29 just engages roller 53 at both tangency points 54 and 55. If the disc is long, assuming motion to the left, the pin 29 hits roller 53 just before the tangency point 55 and is held until disc 15 slips to orient and correct itself. If short, it hits roller 53 just before tangency point 54 and is held until disc 15 slips to orient and correct itself.

One advantage of this invention is that it provides a measuring device which is very inexpensive as compared to other forms of devices which are capable of similar accuracy. Due to the adjustable preload force and resultant variation of the effective rolling diameter of the disk, known machining techniques may be utilized to manufacture a disc which is then capable of extreme accuracy when used in accord with the present invention. Furthermore, any cumulative error is accurately and repeatedly eliminated by the re-zeroing or synchronizing arrangement.

While specific embodiments of a measuring method and apparatus have been illustrated and described herein, those skilled in the art will readily appreciate that this invention is susceptible to numerous changes and modifications without departing from the spirit of the present invention. Therefore, we do not intend to be limited except by the scope of the appended claims.

Having described my invention, I claim:

1. In a machine tool of the type which comprises a work support, a tool support, and means for effecting movement of one of said supports relative to the other, the improvement which comprises, a flat reference surface on one support, a disc mounted for rotation about an axis substantially fixed, with respect to the direction of said movement, relative to the other support and disposed to frictionally engage in rolling relationship the reference surface, means driven by rotation of the rotatable disc for measuring displacement of said one support relative to the other, and means for periodically and automatically repositioning the measuring disc relative to the reference surface during rotational movement of the disc relative to the reference surface by overriding the frictional engagement of said disc with said reference surface, said means comprising position securing means therefor and presenting complementary surfaces on said disc and adjacent said reference surface respectively, which positively engage to reposition said disc, and at least one of said surfaces being adjustable, as to the position in which it is secured, in the direction of movement of the disc relative to the reference surface.

2. A machine tool improvement as in claim 1 wherein said repositioning means comprises a pin eccentrically and rigidly mounted on said disc, and synchronizing means located on said one support in proximity to said reference surface for contacting and orienting said pin so as to minimize cumulative error in said measuring means.

3. A machine tool improvement as in claim 2 wherein said synchronizing means comprises a block having surfaces angled for corrective orientation of said pin and disc during movement of said pin relative to said block.

4. A machine tool improvement as in claim 3 wherein the pin on the disc describes, as the disc rotates, a cycloidal path having a path apex near the reference surface and wherein the synchronizing means is placed opposite this apex.

5. A machine tool improvement as in claim 3 wherein extensions of said surfaces form an apex at their intersection and wherein said apex is adjustable with respect to said reference surface.

6. A machine tool improvement as in claim 1 wherein said measuring disc is mounted for relative motion of its axis toward and away from said reference surface and including adjustable pressing means for varying the effective rolling diameter of the disc by forcing it against the reference surface.

7. In a machine tool of the type which comprises a work support, a tool support, and means for effecting movement of one of said supports relative to the other, the improvement which comprises, a flat reference surface on one support, a disc mounted for rotation about an axis substantially fixed, with respect to the direction of said movement, relative to the other support and disposed to frictionally engage in rolling relationship the reference surface, means driven by rotation of the rotatable disc for measuring displacement of said one support relative to the other, and means for periodically and automatically repositioning the measuring disc relative to the reference surface during rotational movement of the disc relative to the reference surface by overriding the frictional engagement of said disc with said reference surface, said means comprising position securing means therefor and presenting complementary surfaces on said disc and adjacent said reference surface respectively, which positively engage to reposition said disc, wherein said repositioning means comprises a pin eccentrically and rigidly mounted on said disc, and synchronizing means located on said one support in proximity to said reference surface for contacting and orienting said pin so as to minimize cumulative error in said measuring means and wherein said synchronizing means comprises pin means, stationary with respect to said reference surface, and mounted for correcting engagement with the pin mounted on said disc.

8. A machine tool improvement as in claim 7 wherein a roller bearing is mounted on said stationary pin for substantially frictionless correcting engagement with the pin mounted on said disc.

9. A machine tool improvement as in claim 2 wherein said synchronizing means comprises two blocks, each having an angled surface and each being mounted in proximity to the reference surface such that the angled surfaces cooperate to define a pin-receiving indentation.

10. A machine tool improvement as in claim 9 wherein extensions of the angled surfaces intersect to form an apex and wherein at least one of said blocks is adjustably mounted such that the apex may be adjusted with respect to said reference surface for accurate positioning of said pin.

11. In an electrically programmable machine tool of the type which comprises a work support, a tool support, and means for effecting movement of one of said supports relative to the other in response to an electrical command signal, the improvement which comprises, a flat reference surface on one support, a disc mounted for rotation about an axis substantially fixed, with respect to the direction of said movement, relative to the other support and disposed to frictionally engage in rolling relationship the reference surface, an electrical signal generator connected to the rotatable disc and operable to generate a feedback signal which is a measure of displacement of said one support relative to the other, and means for periodically and automatically repositioning the measuring disc relative to the reference surface during rotational movement of the disc relative to the reference surface by overriding the frictional engagement of said disc with said reference surface, said means comprising position securing means therefor and presenting complementary surfaces on said disc and adjacent said reference surface respectively, which positively engage to reposition said disc, and at least one of said surfaces being adjustable, as to the position in which it is secured, in the direction of movement of the disc relative to the reference surface.

12. A machine tool improvement as in claim 11 wherein said repositioning means comprises
   a pin eccentrically and rigidly mounted on said disc, and
   synchronizing means located on said one support in proximity to said reference surface for contacting and orienting said pin so as to minimize cumulative error in said electrical signal generator feedback signal.

13. A machine tool improvement as in claim 12 wherein said synchronizing means comprises a block having surfaces angled for corrective orientation of said pin and disc during movement of said pin relative to said block.

14. A machine tool improvement as in claim 13 wherein the pin on the disc describes, as the disc rotates, a cycloidal path having a path apex near the reference surface and wherein the synchronizing means is placed opposite this apex.

15. A machine tool improvement as in claim 13 wherein extensions of said surfaces form an apex at their intersection and wherein said apex is adjustable with respect to said reference surface.

16. A machine tool improvement as in claim 11 wherein said measuring disc is mounted for relative motion of its axis toward and away from said reference surface and including adjustable pressing means for varying the effective rolling diameter of the disc by forcing it against the reference surface.

17. In an electrically programmable machine tool of the type, which comprises a work support, a tool support, and means for effecting movement of one of said supports relative to the other in response to an electrical command signal, the improvement which comprises,
   a flat reference surface on one support,
   a disc mounted for rotation about an axis substantially fixed, with respect to the direction of said movement, relative to to the other support and disposed to frictionally engage in rolling relationship the reference surface,
   an electrical signal generator connected to the rotatable disc and operable to generate a feedback signal which is a measure of displacement of said one support relative to the other, and
   means for periodically and automatically repositioning the measuring disc relative to the reference surface during rotational movement of the disc relative to the reference surface by overriding the frictional engagement of said disc with said reference surface, said means comprising position securing means therefor and presenting complementary surfaces on said disc and adjacent said reference surface respectively, which positively engage to reposition said disc, wherein said synchronizing means comprises pin means, stationary with respect to said reference surface, and mounted for correcting engagement with the pin mounted on said disc.

18. A machine tool improvement as in claim 17 wherein a roller bearing is mounted on said stationary pin for substantially frictionless correcting engagement with the pin mounted on said disc.

19. A machine tool improvement as in claim 12 wherein said synchronizing means comprises two blocks, each having an angled surface and each being mounted in proximity to the reference surface such that the angled surfaces cooperate to define a pin receiving indentation.

20. A machine tool improvement as in claim 19 wherein extensions of the angled surfaces intersect to form an apex and wherein at least one of said blocks is adjustably mounted such that the apex may be adjusted with respect to said reference surface for accurate positioning of the pin.

21. A method of measuring the position of a first element with respect to the position of a second element including the steps of
   securing a rotatable friction disc to one element,
   biasing said disc to frictionally engage a reference surface located on another element,
   moving one element with respect to the other element, thereby causing said disc to rotate,
   measuring the rotational displacement of the disc with respect to the reference surface, and
   periodically and automatically repositioning the friction disc with respect to the reference surface during rotational movement of the disc relative to the reference surface by overriding said frictional engagement at a frequency of less than once for every revolution of said disc, and
   thereby correcting the displacement of said disc.

22. The method of claim 21 wherein said disc is provided with an eccentrically mounted pin and wherein the step of repositioning the friction disc includes engaging said pin, with corresponding correcting surfaces and thereby overriding said frictional engagement to correct any accumulated error.

23. The method of claim 22 including the step of,
   pivotally securing the disc to one element,
   biasing the disc into engagement with the reference surface of another element with a pre-determined preload force, and
   adjusting the preload force to vary the effective rolling diameter of the disc and thereby preclude the accumulation of any error.

24. In a machine tool of the type which comprises a work support, a tool support, and means for effecting movement of one of said supports relative to the other, the improvement which comprises,
   a flat reference surface on one support,
   a frictionally-driven rotatable disc secured to the other support and disposed to frictionally engage in rollin relationship the reference surface,
   means operatively connected to the rotatable disc for measuring displacement of aid one support relative to the other, and
   means for periodically and automatically repositioning the measuring disc relative to the reference surface during rotational movement of the disc relative to the reference surface by overriding the frictional engagement of said disc with said reference surface, said repositioning means effecting relative slippage between said disc and said reference surface at a frequency of less than once for every revolution of said disc.

* * * * *